United States Patent Office 3,594,139
Patented July 20, 1971

3,594,139
TERTIARY AMINE OXIDE CONCENTRATES
Roland A. Bouffard, Union, N.J., assignor to Esso
Research and Engineering Company
No Drawing. Continuation-in-part of application Ser. No.
547,731, May 5, 1966, now Patent No. 3,387,953. This
application Oct. 31, 1967, Ser. No. 3,387,953.
Int. Cl. C10l 1/22
U.S. Cl. 44—72    9 Claims

ABSTRACT OF THE DISCLOSURE

A rust-inhibitor concentrate that can be handled satisfactorily at all normal blending temperatures throughout the year and that presents no blending problems when added to gasoline comprises 30 to 60 wt. percent of a tertiary amine axide, from 30 to 60 wt. percent of a liquid aromatic hydrocarbon of 7 to 10 carbon atoms having a boiling point in the range of 230 to 400° F., and from 5 to 20 wt. percent of an aliphatic monohydric or dihydric alcohol of from 6 to 13 carbon atoms.

DESCRIPTION OF THE INVENTION

This application is a continuation-in-part of application Ser. No. 547,731, filed May 5, 1966, now U.S. Pat. 3,387,953.

The present invention concerns improvements in concentrated solutions of tertiary amine oxides that are intended for use as additives for petroleum hydrocarbons, especially gasoline. It has recently been found that organo-substituted nitrogen oxides, and particularly tertiary alkyl amine oxides, are very satisfactory rust inhibitors for gasoline. These inhibitors prevent the rusting of ferrous surfaces brought about by the presence of traces of moisture in the gasoline.

The use of amine oxides as rust inhibitors for gasoline is disclosed and claimed in the aforementioned copending application Ser. No. 547,731. Amine oxides that are particularly useful as additives for gasoline for the purpose of preventing rust include those of the formula:

as well as those of the formula:

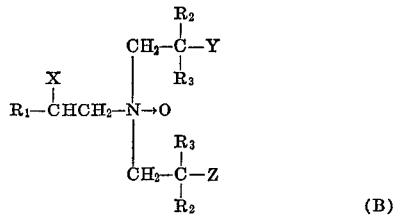

in Formula A, $R_1$ is $C_6$ to $C_{24}$ alkyl, aryl, cycloaliphatic, heterocyclic, substituted alkyl or substituted aryl, and $R_2$ and $R_3$ are the same or different and are $C_1$ to $C_{24}$ alkyl, aryl, substituted alkyl or aryl, cycloaliphatic or heterocyclic. Preferably $R_1$ is $C_9$ to $C_{20}$ alkyl or alkylated aryl, e.g., phenyl with $C_3$ to $C_{14}$ alkyl group, and $R_2$ and $R_3$ are $C_1$ to $C_{12}$ alkyl.

In Formula B, $R_1$ is an alkyl, aryl, alkylated aryl, substituted alkyl, substituted aryl, or cycloaliphatic group of from 6 to 24 carbon atoms, preferably $C_8$ to $C_{18}$. $R_2$ is either hydrogen or a methyl group, $R_3$ is either hydrogen or a $C_1$ to $C_8$ alkyl group, and X, Y, and Z are either hydrogen, OH, $NH_2$, SH or ester groups. When X, Y, and Z are ester groups, $R_1$, $R_2$, and $R_3$ are preferably hydrogen or methyl groups.

Particularly useful are amine oxides derived from fatty tertiary amines, as for example those of the type wherein in Formula A any or all of the R groups are $C_8$ to $C_{18}$ groups derived from a fatty acid, e.g., stearic acid, or from mixed fatty acids, e.g., from coconut oil, tallow or the like. Such amine oxides where $R_1$ is long chain alkyl and $R_2$ and $R_3$ are short chain alkyl, e.g., methyl, isopropyl, or hydroxy alkyl are commercially available and can be prepared as described by D. B. Lake and G. L. K. Hoh in Journal of American Oil Chemists Society, vol. 40, p. 628 (November 1963). Commercial amine oxides of this type include bis (2-hydroxethyl) cocoamine oxide, bis (2-hydroxethyl) tallowamine oxide, bis (2-hydroxyethyl) stearylamine oxide, dimethylcocoamine oxide, dimethyl hydrogenated tallowamine oxide, and dimethylhexadecylamine oxide. By cocoamine is meant the mixed amines prepared from the mixed fatty acids of coconut oil.

To prepare compounds of the type of Formula B, wherein Y and Z are hydroxy, a primary amine such as dodecyl amine may be reacted with two moles of alkylene oxide such as ethylene oxide, propylene oxide, octylene oxide, or decylene oxide, and the resulting hydroxy amine is mildly oxidized to the amine oxide. To prepare a compound of this type when there is only one hydroxyl group present, one can start with one mole of a secondary amine and react it with an equal molar proportion of an alkylene oxide and then oxidize the product to an amine oxide.

To prepare compounds of the type represented by Formula B wherein X, Y, and Z are all hydroxy, a dialkanol amine can be reacted with a 1,2-epoxy alkane in the presence of anhydrous aluminum chloride prior to oxidation to the amine oxide. This type of preparation is taught in U.S. Pat. 3,202,714.

An amine oxide of the type of Formula B where $R_1$ is an alkylated aryl group can be prepared from the condensation product of an alkylated styrene oxide with a primary or secondary amine.

To prepare a compound of the type of Formula B wherein X and Y are amino groups, an alkylene polyamine such as diethylene triamine can be alkoxylated at just one of the amino groups, after which the product can be oxidized.

Thiol groups can be introduced by using thioepoxides in place of epoxides in any of the reactions described above. An amine oxide with ester groups can be prepared by esterifying the hydroxyl groups of a hydroxy amine oxide.

Specific examples of compounds represented by Formula A, wherein $R_1$, $R_2$, and $R_3$ are unsubstituted, include diethyldecyl amine oxide, dimethylhexadecyl amine oxide and methyl isopropyl cetyl amine oxide. Specific examples of compounds defined by Formula B include the following:

(I) $R_1$ is $C_{10}$ alkyl; $R_2$ and $R_3$ are hydrogen; and X, Y, and Z are $NH_2$.

(II) $R_1$ is $C_{18}$ alkyl; $R_2$ is methyl; $R_3$ is hydrogen; X is hydrogen; and Y and Z are OH.

(III) $R_1$ is $C_6$ alkyl; $R_2$ is methyl; and $R_3$ is $C_6$ alkyl; X and Y are hydrogen and Z is a SH group.

Other compounds useful in this invention include N,N',N'-trimethyl N-decyl ethylene diamine N,N'-dioxide and N,N',N'-trimethyl N-octadecyl ethylene diamine N,N'-dioxide.

While the simple amine oxides having only the N→O group will give satisfactory rust protection, added rust protection can be provided by using compounds wherein there are additional functional groups such as hydroxy, amino, ester, or mercapto, in the beta to delta position to the nitrogen atom, most advantageously in the beta position, to increase the polarity of the amine oxide. The N→O group is the active group that provides the rust inhibition. The providing of an additional polar group positioned proximate to the N→O group, e.g., in the beta position, is believed to enhance the adsorption of the compound on a metal surface to supply a rust protecting barrier.

Amine oxides as conventionally supplied commercially are in aqueous alcohol solution, for example as a concentrate that contains 40 to 50 wt. percent of the amine oxide, 30 to 35 wt. percent of water, and 15 to 30% of isopropyl alcohol. In this form, amine oxides present a solubility problem when blending them with gasoline because of the presence of the water. The water can be eliminated by adding xylene to the commercial concentrate and removing the water by distillation as an azeotrope. The resulting concentrate of amine oxide in xylene can be blended satisfactorily in gasoline with no solubility problem. However, the concentrate of amine oxide in xylene presents a further problem because the pour point of the concentrate is undesirably high and the concentrate cannot be satisfactorily handled in the winter time.

In accordance with the present invention it has now been found that a concentrate of an amine oxide that can be handled satisfactorily at all normal blending temperatures throughout the year and that presents no blending problem in gasoline can be prepared by dissolving the amine oxide in a mixture of a liquid aromatic hydrocarbon of from 7 to 10 carbon atoms and an aliphatic monohydric or dihydric alcohol having from about 6 to about 13 carbon atoms. Such concentrates will contain from about 30 to about 60% (preferably 40 to 60 wt. percent) of the amine oxide, from about 30 to 60 wt. percent) (preferably 35 to 50 wt. percent) of aromatic hydrocarbons, and from about 5 to 20 wt. percent (preferably 4 to 15 wt. percent) of the alcohol. The amount of the alcohol used in the concentrate will be sufficient to lower the pour point to at least 0° F. and will preferably be sufficient to lower the pour point to at least −10° F.

Mixtures of aromatic hydrocarbons can be used. The aromatic hydrocarbon should have a boiling point in the range of about 230° F. to 400° F. and preferably in the range of about 275° to 375° F. The $C_8$ and $C_9$ liquid aromatic hydrocarbons are preferred, including ortho and meta zylenes, ethyl benzene, isopropyl benzene, ortho ethyl toluene, 1,2,4-trimethyl benzene, and mesitylene. While toluene can be used, its relatively low flash point is generally objectionable, requiring special handling if the amine oxide concentrate is to be shipped from one location to another. Ortho xylene or meta xylene, mixed xylenes, or mixtures of the xylenes with ethyl benzene, are particularly preferred.

The aliphatic alcohols that are used in this invention include monohydric and dihydric alcohols having from 6 to 13 carbon atoms, e.g. hexyl alcohol, nonyl alcohol, lauryl alcohol, 2-ethyl-1,3-hexanediol, n-decanol, iso-octyl alcohol, etc. Particularly useful are the oxo alcohols of from 6 to 13 carbon atoms. The process for preparing these alcohols is well known in the art and involves reaction of olefins with carbon monoxide and hydrogen in the presence of a suitable catalyst, such as a cobalt carbonyl. The products of this reaction are principally aldehydes, which are then converted to alcohols by hydrogenation in a separate catalytic stage.

The advantage of using xylene rather than the commercial mixture of water and isopropyl alcohol as a solvent for amine oxides when blending the amine oxides in gasoline is shown by the following comparative tests:

TEST I

A concentrate consisting of 50 wt. percent of bis-(2-hydroxyethyl) cocoamine oxide, 35% water, and 15% isopropyl alcohol had a cloud point lower than 0° F. and a pour point of −30° F. When the water and the isopropyl alcohol were displaced from the concentrate by azeotroping the concentrate with xylene and a concentrate was then prepared consisting of 50 wt. percent of the amine oxide and 50 wt. percent of xylene, the resulting concentrate had a cloud point of +35° F. and a pour point of +15° F. However, the concentrate in xylene was much more soluble in various gasoline components than was the original aqueous alcohol concentrate of the amine oxide. This is shown by the data in Table I. The xylene that was used was a commercial mixture consisting of about 20 vol. percent ortho xylene, 50 vol. percent meta xylene, 10 vol. percent para xylene, and 20 vol. percent ethyl benzene. The same commercial mixture was used in all of the tests described herein. Also included in Table I are data showing that a concentrate blend of about 47 wt. percent of the amine oxide, about 8 wt. percent of $C_8$ oxo alcohol, and about 45 wt. percent of mixed xylenes was also satisfactorily soluble in all of the gasoline components. The latter concentrate was also readily soluble in a premium grade gasoline containing 3.1 cc. of lead tetraethyl per gallon.

TABLE I

Comparison of solubility of bis(2-hydroxyethyl) cocoamine oxide in xylene concentrate versus concentrate in aqueous alcohol]

| Gasoline component | 50 wt. percent amine oxide in aq. isopropyl alcohol, ptb.* | 50 wt. percent amine oxide in xylenes ¹ ptb. | Amine oxide in $C_8$ oxo alcohol + xylenes ² ptb. |
|---|---|---|---|
| Powerformate ³ | 100 | >16,000 | >16,000 |
| Alkylate ⁴ | 40 | 1,500 | 1,800 |
| Lt. cat. naphtha ⁵ | 33 | 16,000 | 16,000 |
| Lt. cat. naphtha/alkylate blend ⁶ | 40 | 5,000 | 5,000 |
| Powerformate/alkylate blend ⁵ | 70 | 16,000 | 16,000 |

¹ Commercial mixed xylenes. See text.
² About 47 wt. percent bis (2-hydroxyethyl) cocoamine oxide, 45 wt. percent commercial mixed xylenes and 7 wt. percent $C_8$ oxo alcohol.
³ Boiling range 85° to 450° F.
⁴ From alkylation of butenes with isobutane. Boiling range 122–406° F.
⁵ Boiling range 80–400° F.
⁶ 50 vol. percent of each.
*Ptb. is pounds per thousand barrels (1 barrel=42 gallons).

TEST II

The following test shows the advantage gained in pour point by employing a mixture of xylene and a $C_8$ alcohol in place of xylene alone when preparing an amine oxide concentrate. Various proportions of $C_8$ oxo alcohol were added to a concentrate consisting of 50 wt. percent of bis-2-hydroxyethyl cocoamine oxide and 50 wt. percent of commercial mixed xylenes and the cloud points and the pour points of the resulting blends were determined, using standard procedures as known in the lubricant art. These data are shown in Table II. $C_8$ oxo alcohol is a mixture of branched chain aliphatic alcohols of 8 carbon atoms prepared by reaction of carbon monoxide on mixed $C_3$–$C_4$ olefins followed by hydrogenation of the resulting aldehydes. While the pour point of the concentrate is the important measurement insofar as showing whether the concentrate can be satisfactorily handled in the winter time, the cloud point determination is also frequently of significance in indicating whether any handling or storage problem will arise at low temperatures. A cloud point of 0° F. or higher indicates borderline acceptability.

TABLE II

[Effect of $C_8$ oxo alcohol on cloud and pour points of 50 wt. percent concentrate of bis-(2-hydroxyethyl) cocoamine oxide in mixed xylenes]

| Xylene concentrate, wt. percent | 96 | 95 | 93 | 90 |
|---|---|---|---|---|
| $C_8$ oxo alcohol, wt. percent | 4 | 5 | 7 | 10 |
| Cloud point, ° F | +6 | +6 | −16 | −20 |
| Pour point, ° F | −20 | −20 | −25 | −350 |

TEST III

To a concentrate consisting of 35 wt. percent of dimethyl lauryl amine oxide, different proportions of $C_8$ Oxo alcohol or of 4-methylpentane-2,4-diol were added and the effects on cloud point and pour point were noted. The results appear in Table III.

TABLE III

[Effect of alcohols on cloud and pour points of 35 wt. percent concentrate of dimethyl lauryl amine oxide in mixed xylenes]

| | Cloud point, °F. | Pour point, °F. |
|---|---|---|
| Amine oxide concentrate | 82 | 10. |
| Concentrate plus $C_8$ oxo alcohol: | | |
| 5 wt. percent added | 52 | Lower than −25. |
| 10 wt. percent added | −2 | Do. |
| Concentrate plus 4-methylpentane-2,4-diol: | | |
| 5 wt percent added | 28 | Do. |
| 10 wt. percent added | −2 | Do. |

Non-limiting examples of amine oxide concentrates coming within the scope of the invention are given in Table IV. The numbers given in the table refer to weight percentages based on the total composition. The $C_{12}$ "Alfol" group referred to in one of the examples designates a straight-chain primary alkyl group derived from petrochemical raw materials as referred to by Lake and Hoh, supra.

| Amine oxide | Hydrocarbon | Alcohol |
|---|---|---|
| Bis(2-hydroxyethyl) cocoamine oxide (50). | Mixed xylenes (40). | Dodecanol (10). |
| Dimethyl cocoamine oxide (45). | Mesitylene (45). | n-Hexanol (10). |
| Bis(2-hydroxyethyl) tallow amine oxide (40). | Toluene (25) γ-xylene (35). | $C_{13}$ oxo alcohols (10). |
| Dimethyl $C_{12}$ "Alfol" amine oxide (35). | Mixed xylenes (50). | $C_8$ oxo alcohols (15). |
| N-(lauryl tri-β-ethoxy) dimethyl amine oxide (45). | Ethylbenzene (45). | Dipropylene glycol (10). |

The specific embodiments herein described are merely illustrative of the invention and it is not intended to limit the invention thereto. The scope of the invention is to be determined by the appended claims.

What is claimed is:

1. A rust inhibitor concentrate for blending with gasoline to impart rust inhibiting properties thereto which comprises from 30 to 60 wt. percent of a tertiary amine oxide, from 30 to 60 wt. percent of a liquid aromatic hydrocarbon having a total of from 7 to 10 carbon atoms and boiling within the range of 230° to 400° F., and from 5 to 20 wt. percent of an aliphatic alcohol having from 6 to 13 carbon atoms, said tertiary amine oxide having the formula:

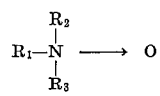

wherein $R_1$, $R_2$, and $R_3$ are $C_8$ to $C_{18}$ alkyl or $C_1$ to $C_3$ alkyl or hydroxy alkyl, at least one of $R_1$, $R_2$ and $R_3$ being $C_8$ to $C_{18}$ alkyl.

2. Concentrate as defined by claim 1 wherein said amine oxide is bis (2-hydroxyethyl) cocoamine oxide.

3. Concentrate as defined by claim 1 wherein said amine oxide is bis (2-hydroxyethyl) tallowamine oxide.

4. Concentrate as defined by claim 1 wherein said amine oxide is dimethyl cocoamine oxide.

5. Concentrate as defined by claim 1 wherein said hydrocarbon is a xylene.

6. Concentrate as defined by claim 1 wherein said alcohol is a $C_8$ oxo alcohol.

7. Concentrate as defined by claim 1 wherein said alcohol is a dihydric alcohol.

8. Concentrate as defined by claim 1 wherein said aromatic hydrocarbon includes ethyl benzene.

9. Concentrate as defined by claim 1 wherein said aliphatic alcohol concentration is sufficient to lower the pour point of said concentrate to at least 0° F.

References Cited

UNITED STATES PATENTS 3,007,784  11/1961  Ebner _____ 44—72
3,277,003  10/1966  Gragson _____ 252—392

DANIEL E. WYMAN, Primary Examiner
Y. H. SMITH, Assistant Examiner

U.S. Cl. X.R.

44—56; 252—392